(12) United States Patent
Honda

(10) Patent No.: US 10,949,185 B2
(45) Date of Patent: Mar. 16, 2021

(54) INFORMATION PROCESSING APPARATUS, SETUP METHOD, AND COMPUTER-READABLE STORAGE MEDIUM

(71) Applicant: CASIO COMPUTER CO., LTD., Tokyo (JP)

(72) Inventor: Hirotake Honda, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 93 days.

(21) Appl. No.: 16/122,560

(22) Filed: Sep. 5, 2018

(65) Prior Publication Data
US 2019/0073206 A1 Mar. 7, 2019

(30) Foreign Application Priority Data
Sep. 6, 2017 (JP) .............................. JP2017-170773

(51) Int. Cl.
*G06F 8/61* (2018.01)
*G06F 9/445* (2018.01)
*G06F 21/12* (2013.01)
*G06F 21/31* (2013.01)

(52) U.S. Cl.
CPC ................ *G06F 8/61* (2013.01); *G06F 9/445* (2013.01); *G06F 21/121* (2013.01); *G06F 21/31* (2013.01); *G06F 9/4451* (2013.01)

(58) Field of Classification Search
CPC ... G06F 8/61; G06F 8/65; G06F 9/445; G06F 21/121; G06F 21/31
See application file for complete search history.

(56) References Cited

U.S. PATENT DOCUMENTS

| 6,049,670 A | * | 4/2000 | Okada ....................... G06F 8/61 717/177 |
| 10,171,985 B1 | * | 1/2019 | Czajka, II ............. H04W 8/005 |
| 2002/0066095 A1 | * | 5/2002 | Yu .............................. G06F 8/65 717/173 |

(Continued)

FOREIGN PATENT DOCUMENTS

| JP | 2003223324 A | 8/2003 |
| JP | 2004094682 A | 3/2004 |

(Continued)

*Primary Examiner* — Wei Y Zhen
*Assistant Examiner* — Binh Luu
(74) *Attorney, Agent, or Firm* — Holtz, Holtz & Volek PC

(57) ABSTRACT

An information processing apparatus which transmits data to setup predetermined software in a terminal includes a processor. The processor is configured to perform the following processing operation, a receiving process which receives registration of user information, a first generating process which generates an installer to install the data including user identification information to identify a user according to the user information received in the receiving process, a setting process which sets the installer generated in the first generating process to be downloadable, and a first transmitting control process which transmits to a terminal in which the installer is started the data corresponding to the user information when the installer is downloaded and started, and the terminal in which the installer is started is connected to the information processing apparatus through a network.

11 Claims, 12 Drawing Sheets

(56) References Cited

U.S. PATENT DOCUMENTS

| | | | | |
|---|---|---|---|---|
| 2003/0225871 A1* | 12/2003 | Calinov | ............ | G06F 21/41 |
| | | | | 709/223 |
| 2004/0143830 A1* | 7/2004 | Gupton | ............ | G06F 8/61 |
| | | | | 717/174 |
| 2006/0136895 A1* | 6/2006 | Barr | ............ | G06F 8/65 |
| | | | | 717/168 |
| 2006/0223503 A1* | 10/2006 | Muhonen | ............ | G06F 8/61 |
| | | | | 455/414.1 |
| 2008/0077915 A1* | 3/2008 | Kahan | ............ | G06F 8/60 |
| | | | | 717/178 |
| 2010/0162234 A1* | 6/2010 | Wang | ............ | G06F 8/61 |
| | | | | 717/178 |
| 2011/0179411 A1* | 7/2011 | Lederer | ............ | G06F 16/955 |
| | | | | 717/178 |
| 2012/0131570 A1* | 5/2012 | Kaikkonen | ............ | H04M 1/72525 |
| | | | | 717/177 |
| 2012/0173305 A1* | 7/2012 | Bhaskaran | ............ | G06Q 30/0203 |
| | | | | 705/7.32 |
| 2012/0233235 A1* | 9/2012 | Allaire | ............ | B01J 6/008 |
| | | | | 709/201 |
| 2013/0298104 A1* | 11/2013 | Kletsky | ............ | G06F 8/70 |
| | | | | 717/102 |
| 2014/0309804 A1* | 10/2014 | Ricci | ............ | A61B 5/7405 |
| | | | | 701/1 |
| 2015/0026675 A1* | 1/2015 | Csaszar | ............ | G06F 8/61 |
| | | | | 717/178 |
| 2016/0034305 A1* | 2/2016 | Shear | ............ | G06F 16/248 |
| | | | | 707/722 |
| 2016/0036667 A1* | 2/2016 | Kripalani | ............ | H04L 67/34 |
| | | | | 709/224 |
| 2019/0073206 A1* | 3/2019 | Honda | ............ | G06F 9/445 |

FOREIGN PATENT DOCUMENTS

| | | |
|---|---|---|
| JP | 2007141168 A | 6/2007 |
| JP | 2017097734 A | 6/2014 |

\* cited by examiner

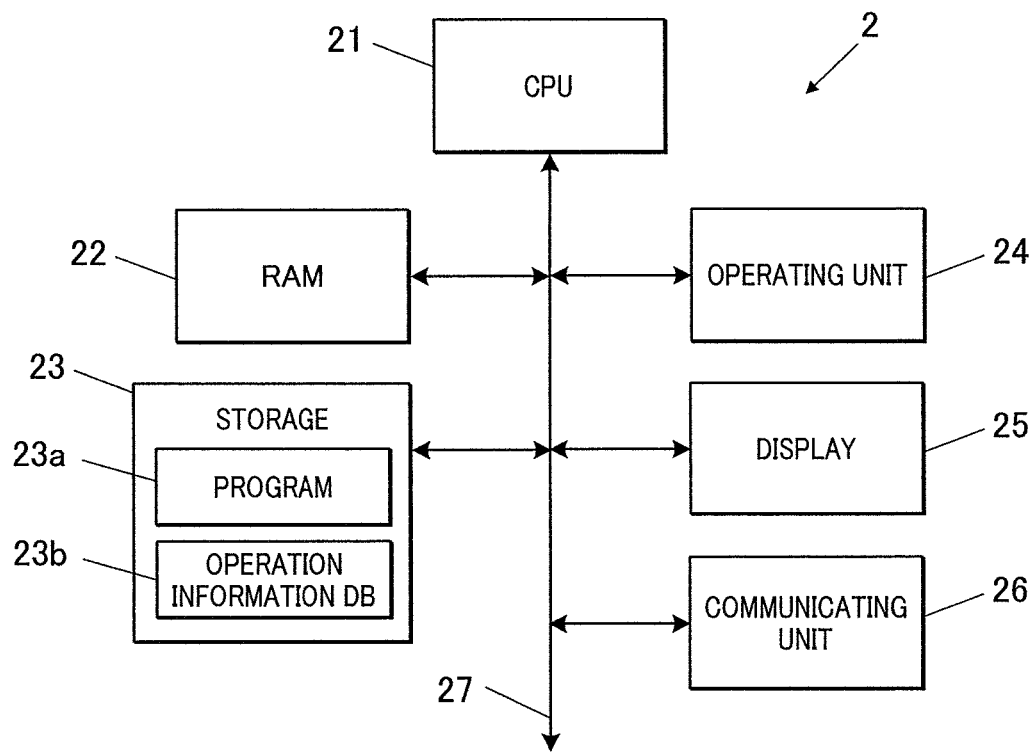
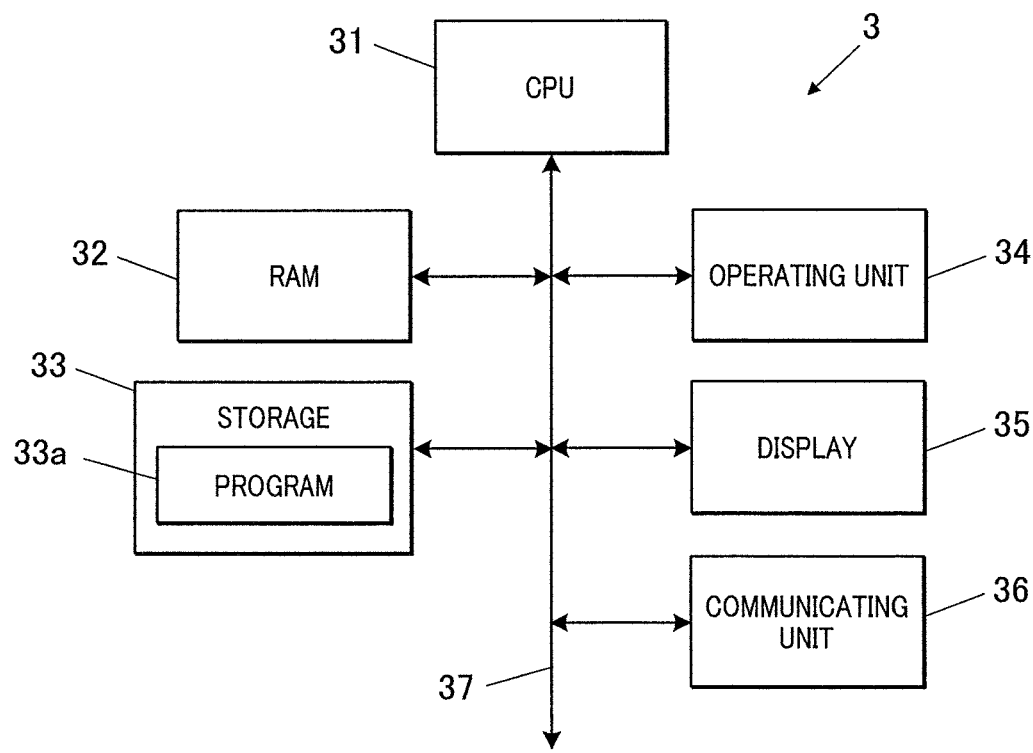

FIG.7

THANK YOU FOR MEMBERSHIP REGISTRATION.
ACCOUNT REGISTRATION (NO CHARGE) IS NECESSARY TO USE THIS SERVICE.
PLEASE INPUT E-MAIL ADDRESS AND SET PASSWORD.

E-MAIL ADDRESS  *  — A1

E-MAIL ADDRESS (FOR CONFIRMATION)  *  — A2

PASSWORD  *  — A3

REGISTER BUTTON — B1

CANCEL BUTTON — B2

FIG.8

```
┌─────────────────────────────────────────────────────┐
│                                                  ─52│
│  PLEASE INPUT THE FOLLOWING ITEMS AND CLICK "REGISTER BUTTON"
│    PASSWORD                                         │
│   ┌──────────────────────────────────────┐       A4 │
│   └──────────────────────────────────────┘          │
│                                                     │
│    CONTRACTANT NAME  *                              │
│   ┌──────────────────────────────────────┐       A5 │
│   └──────────────────────────────────────┘          │
│    CONTRACTANT NAME (KANA-CHARACTER)  *             │
│   ┌──────────────────────────────────────┐       A6 │
│   └──────────────────────────────────────┘          │
│    COMPANY NAME  *                                  │
│   ┌──────────────────────────────────────┐       A7 │
│   └──────────────────────────────────────┘          │
│    POSTAL CODE  *                                   │
│   ┌──────────────────────────────────────┐       A8 │
│   └──────────────────────────────────────┘          │
│    ADDRESS  *                                       │
│   ┌──────────────────────────────────────┐       A9 │
│   └──────────────────────────────────────┘          │
│    PHONE NUMBER  *                                  │
│   ┌──────────────────────────────────────┐      A10 │
│   └──────────────────────────────────────┘          │
│    FAX NUMBER  *                                    │
│   ┌──────────────────────────────────────┐      A11 │
│   └──────────────────────────────────────┘          │
│    INDUSTRY TYPE CLASSIFICATION  *                  │
│   ┌──────────────────────────────────────┐      A12 │
│   └──────────────────────────────────────┘          │
│    NUMBER OF EMPLOYEES  *                           │
│   ┌──────────────────────────────────────┐      A13 │
│   └──────────────────────────────────────┘          │
│    SALES  *                                         │
│   ┌──────────────────────────────────────┐      A14 │
│   └──────────────────────────────────────┘          │
│    DEMO DATA                                        │
│   ┌──────────────────────────────────────┐      A15 │
│   └──────────────────────────────────────┘          │
│    SYSTEM USE RANGE                                 │
│   ┌──────────────────────────────────────┐      A16 │
│   └──────────────────────────────────────┘          │
│   ┌───────────────┐           ┌───────────────┐     │
│   │REGISTER BUTTON│           │ CANCEL BUTTON │     │
│   └───────────────┘           └───────────────┘     │
└─────────────────────────────────────────────────────┘
        B3                              B4
```

| INDUSTRY TYPE | INDUSTRY TYPE NAME |
|---|---|
| 01 | FISHERIES |
| 02 | MEAT |
| 03 | FRUIT AND VEGETABLE |
| 04 | SEASONING |
| 05 | FOOD INGREDIENT |
| 06 | BREAD |
| 07 | SNACK |
| 08 | RICE |
| 09 | DRINK |
| 10 | TOFU AND NATTO |
| 11 | SEAWEED AND TEA |
| 12 | DRY FOOD |
| 13 | PICKLED VEGETABLE |
| 14 | NOODLES |
| 15 | EGG |
| 16 | COOKING SUPPLIES |
| 17 | PREPARED FOOD |

| INDUSTRY TYPE | MERCHANDISE CODE | MERCHANDISE NAME | TAX EXCLUDED STANDARD UNIT PRICE |
|---|---|---|---|
| 01 | 000001 | BLUEFIN TUNA | 3,971 |
| | 000002 | YOUNG BLUEFIN TUNA | 945 |
| | 000003 | YELLOWFIN TUNA | 1,590 |
| | 000004 | YOUNG YELLOWFIN TUNA | 816 |
| | 000005 | BIGEYE TUNA | 2,315 |
| | 000006 | YOUNG BIGEYE TUNA | 1,956 |
| | 000007 | ALBACORE TUNA | 593 |
| | 000008 | SOUTHERN BLUEFIN TUNA | 5,010 |
| | 000009 | STRIPED MARLIN | 1,498 |
| | 000010 | SWORDFISH | 1,525 |
| | ⋮ | ⋮ | ⋮ |
| 02 | 000001 | AMERICAN BEEF BONE RIB | 1,680 |
| | 000002 | AMERICAN BEEF TONGUE | 4,033 |
| | 000003 | AMERICAN ANGUS CHUCK TAIL FLAP | 2,520 |
| | 000004 | AUSTRALIAN OUTSIDE SKIRT | 1,900 |
| | 000005 | AUSTRALIAN BEEF RETICULUM | 1,424 |
| | 000006 | AUSTRALIAN CHUCK RIB SLICE | 2,190 |
| | 000007 | JAPANESE BEEF OUTSIDE SKIRT (HANGING TENDER) (DOMESTIC) | 6,150 |
| | 000008 | JAPANESE BEEF SPECIAL RUMEN (DOMESTIC) | 4,284 |
| | 000009 | JAPANESE BEEF CHEEK MEAT (DOMESTIC) | 1,860 |
| | 000010 | JAPANESE BEEF INTESTINE (DOMESTIC) | 2,300 |
| | ⋮ | ⋮ | ⋮ |
| ⋮ | ⋮ | | ⋮ |
| 17 | 000001 | SUGAR 500g | 159 |
| | 000002 | SUGAR 1000g | 236 |
| | 000003 | BROWN SUGAR 750g | 327 |
| | 000004 | SALT 300g | 154 |
| | 000005 | SALT 1000g | 269 |
| | 000006 | VINEGAR 190ml | 209 |
| | 000007 | VINEGAR 500ml | 275 |
| | 000008 | VINEGAR 1000ml | 481 |
| | 000009 | DARK SOY SAUCE 200ml | 203 |
| | 000010 | DARK SOY SAUCE 450ml | 283 |
| | ⋮ | ⋮ | ⋮ |

FIG.12

| INDUSTRY TYPE | UNIT NUMBER | UNIT NAME |
|---|---|---|
| 01 | 01 | kg |
| 02 | 01 | kg |
|  | 02 | PACK(S) |
| 03 | 01 | kg |
|  | 02 | CASE(S) |
|  | 03 | PACK(S) |
| 04 | 01 | UNIT(S) |
|  | 02 | BOTTLE(S) |
| 05 | 01 | L |
|  | 02 | kg |
|  | 03 | CAN(S) |
| 06 | 01 | UNIT(S) |
|  | 02 | UNIT(S) |
|  | 03 | LOAF(VES) |
| 07 | 01 | BOX(ES) |
| 08 | 01 | kg |
|  | 02 | UNIT(S) |
|  | 03 | UNIT(S) |
| 09 | 01 | UNIT(S) |
|  | 02 | BOX(ES) |
|  | 03 | BOTTLE(S) |
| 10 | 01 | kg |
|  | 02 | UNIT(S) |
|  | 03 | BOTTLE(S) |
| 11 | 01 | UNIT(S) |
|  | 02 | BAG(S) |
|  | 03 | BOTTLE(S) |
| 12 | 01 | kg |
|  | 02 | BAG(S) |
| 13 | 01 | kg |
|  | 02 | g |
|  | 03 | BAG(S) |
| 14 | 01 | BAG(S) |
| 15 | 01 | C/S |
|  | 02 | P |
|  | 03 | CAN(S) |
| 16 | 01 | p |
|  | 02 | UNIT(S) |
| 17 | 01 | UNIT(S) |

| FORM NUMBER | FORM NAME | BACKGROUND IMAGE FILE (bmp) | IMAGE INFORMATION FILE (imh) | 01 FISHERIES | 02 MEAT | 03 FRUIT AND VEGETABLE | 04 SEASONING | 05 FOOD INGREDIENT | 06 BREAD | 07 SNACK | 08 RICE | 09 DRINK | 10 TOFU AND NATTO | 11 SEAWEED AND TEA | 12 DRY FOOD | 13 PICKLED VEGETABLE | 14 NOODLES | 15 EGG | 16 COOKING SUPPLIES | 17 PREPARED FOOD |
|---|---|---|---|---|---|---|---|---|---|---|---|---|---|---|---|---|---|---|---|---|
| 901 | INVOICE (A4 VETICAL) | A4 VERTICAL WHITE SHEET | | ○ | ○ | ○ | ○ | ○ | ○ | ○ | ○ | ○ | ○ | ○ | ○ | ○ | ○ | ○ | ○ | ○ |
| 902 | INVOICE (A4 VETICAL/INCLUDING QUANTITY) | A4 VERTICAL WHITE SHEET | | ○ | ○ | ○ | ○ | ○ | ○ | ○ | ○ | ○ | ○ | ○ | ○ | ○ | ○ | ○ | ○ | ○ |
| ... | ... | ... | ... | ... | ... | ... | ... | ... | ... | ... | ... | ... | ... | ... | ... | ... | ... | ... | ... | ... |
| 931 | INVOICE (3 PAGES/A4 VERTICAL INCLUDING RECEIPT) | A4 VERTICAL 3 PAGES WHITE SHEET | | ○ | ○ | ○ | ○ | ○ | ○ | ○ | ○ | ○ | ○ | ○ | ○ | ○ | ○ | ○ | ○ | ○ |
| 932 | INVOICE (3 PAGES/A4 VERTICAL INCLUDING ACCOUNT) | A4 VERTICAL 3 PAGES WHITE SHEET | | ○ | ○ | ○ | ○ | ○ | ○ | ○ | ○ | ○ | ○ | ○ | ○ | ○ | ○ | ○ | ○ | ○ |
| ... | ... | ... | ... | ... | ... | ... | ... | ... | ... | ... | ... | ... | ... | ... | ... | ... | ... | ... | ... | ... |
| C10 | DEPARTMENT STORE UNIFORM SLIP (BUYING 6 LINES) | UNIFORM SLIP HISAGO(BP1709) | | ○ | ○ | ○ | ○ | ○ | ○ | ○ | ○ | ○ | ○ | ○ | ○ | ○ | ○ | ○ | ○ | ○ |
| C11 | DEPARTMENT STORE UNIFORM SLIP (TYPING TYPE II) | UNIFORM SLIP HISAGO(BP1726) | | ○ | ○ | ○ | ○ | ○ | ○ | ○ | ○ | ○ | ○ | ○ | ○ | ○ | ○ | ○ | ○ | ○ |
| C12 | CHAIN STORE UNIFORM SLIP (OCR TYPING TYPE I) | UNIFORM SLIP HISAGO(BP1717) | | ○ | ○ | ○ | ○ | ○ | ○ | ○ | ○ | ○ | ○ | ○ | ○ | ○ | ○ | ○ | ○ | ○ |
| C13 | CHAIN STORE UNIFORM SLIP (TYPING TYPE I) | UNIFORM SLIP HISAGO(BP1706) | | ○ | ○ | ○ | ○ | ○ | ○ | ○ | ○ | ○ | ○ | ○ | ○ | ○ | ○ | ○ | ○ | ○ |
| C14 | CHAIN STORE UNIFORM SLIP (TURN AROUND TYPE I) | UNIFORM SLIP HISAGO(BP1701) | | ○ | ○ | ○ | ○ | ○ | ○ | ○ | ○ | ○ | ○ | ○ | ○ | ○ | ○ | ○ | ○ | ○ |
| C15 | UNIFORM SLIP C TYPE (ORDERED MERCHANDISE) | UNIFORM SLIP HISAGO(BP1712) | | ○ | ○ | ○ | ○ | ○ | ○ | ○ | ○ | ○ | ○ | ○ | ○ | | | | | |
| C16 | INDUSTRY UNIFORM SLIP | UNIFORM SLIP HISAGO(BP1721) | | | | | | | | ○ | | | | | | | | | | |
| C17 | SNACK UNIFORM SLIP | UNIFORM SLIP HISAGO(BP1710) | | | | | | | | | | | | | | | | | | |
| ... | ... | ... | ... | ... | ... | ... | ... | ... | ... | ... | ... | ... | ... | ... | ... | ... | ... | ... | ... | ... |
| D01 | LIQUOR FOOD UNIFORM SLIP | LIQUOR FOOD UNIFORM B4 HORIZONTAL | | | | | ○ | ○ | ○ | | | ○ | | | | | | | | ○ |
| ... | ... | ... | ... | ... | ... | ... | ... | ... | ... | ... | ... | ... | ... | ... | ... | ... | ... | ... | ... | ... |

INFORMATION PROCESSING APPARATUS, SETUP METHOD, AND COMPUTER-READABLE STORAGE MEDIUM

CROSS-REFERENCE TO RELATED APPLICATIONS

This application is based upon and claims the benefit of priority from the prior Japanese Patent Application No. 2017-170773, filed on Sep. 6, 2017, the entire contents of which are incorporated herein by reference.

BACKGROUND OF THE INVENTION

1. Field of the Invention

The present invention relates to an information processing apparatus, a setup method, and a computer-readable storage medium.

2. Description of the Related Art

Conventionally, application software (hereinafter referred to as an app) used in a terminal apparatus such as a personal computer is provided by installing media, or provided by downloading through a network, and there is an installing system in which an app transmitted from an installing apparatus to install an app is installed in an executing apparatus which executes the app (Japanese Patent Application Laid-Open Publication No. 2017-97734).

SUMMARY OF THE INVENTION

According to an aspect of the present invention, there is an information processing apparatus which transmits data to setup predetermined software in a terminal, the apparatus including: a processor, wherein, the processor is configured to perform the following processing operation, a receiving process which receives registration of user information, a first generating process which generates an installer to install the data including user identification information to identify a user according to the user information received in the receiving process, a setting process which sets the installer generated in the first generating process to be downloadable, and a first transmitting control process which transmits to a terminal in which the installer is started the data corresponding to the user information when the installer is downloaded and started, and the terminal in which the installer is started is connected to the information processing apparatus through a network.

According to another aspect of the present invention, there is a setup method for predetermined software, the method including: receiving registration of user information; generating an installer to install data to setup the predetermined software, the data including user identification information to identify a user according to the user information; setting the installer to be downloadable; connecting a terminal in which the installer is started with an information processing apparatus through a network when the installer is downloaded and started; transmitting to the terminal the data corresponding to the user information from the information processing apparatus through a network; and setting up the predetermined software based on the data transmitted from the information processing apparatus to the terminal.

According to another aspect of the present invention, there is a non-transitory computer-readable storage medium having a program stored thereon for controlling a computer used in an information processing apparatus which transmits data to setup predetermined software in a terminal, wherein the program controls the computer to perform the following processing operation: a receiving process which receives registration of user information; a generating process which generates an installer to install the data including user identification information to identify a user according to the user information received in the receiving process; a setting process which sets the installer generated in the generating process to be downloadable; and a transmitting control process which transmits to a terminal in which the installer is started the data corresponding to the user information when the installer is downloaded and started, and the terminal in which the installer is started is connected to the information processing apparatus through a network.

BRIEF DESCRIPTION OF THE DRAWINGS

FIG. 3 is a block diagram showing a functional configuration of a local server.

FIG. 4 is a block diagram showing a functional configuration of a first terminal apparatus.

FIG. 7 is a diagram showing an account registration screen.

FIG. 8 is a diagram showing a membership registration screen.

FIG. 11 is a diagram showing a merchandise sample table.

FIG. 12 is a diagram showing a unit sample table.

FIG. 13 is a diagram showing a form setup state table.

DETAILED DESCRIPTION OF THE PREFERRED EMBODIMENTS

<Configuration of Information Processing System>

A schematic configuration of an information processing system 100 is described with reference to FIG. 1.

Figure 1:
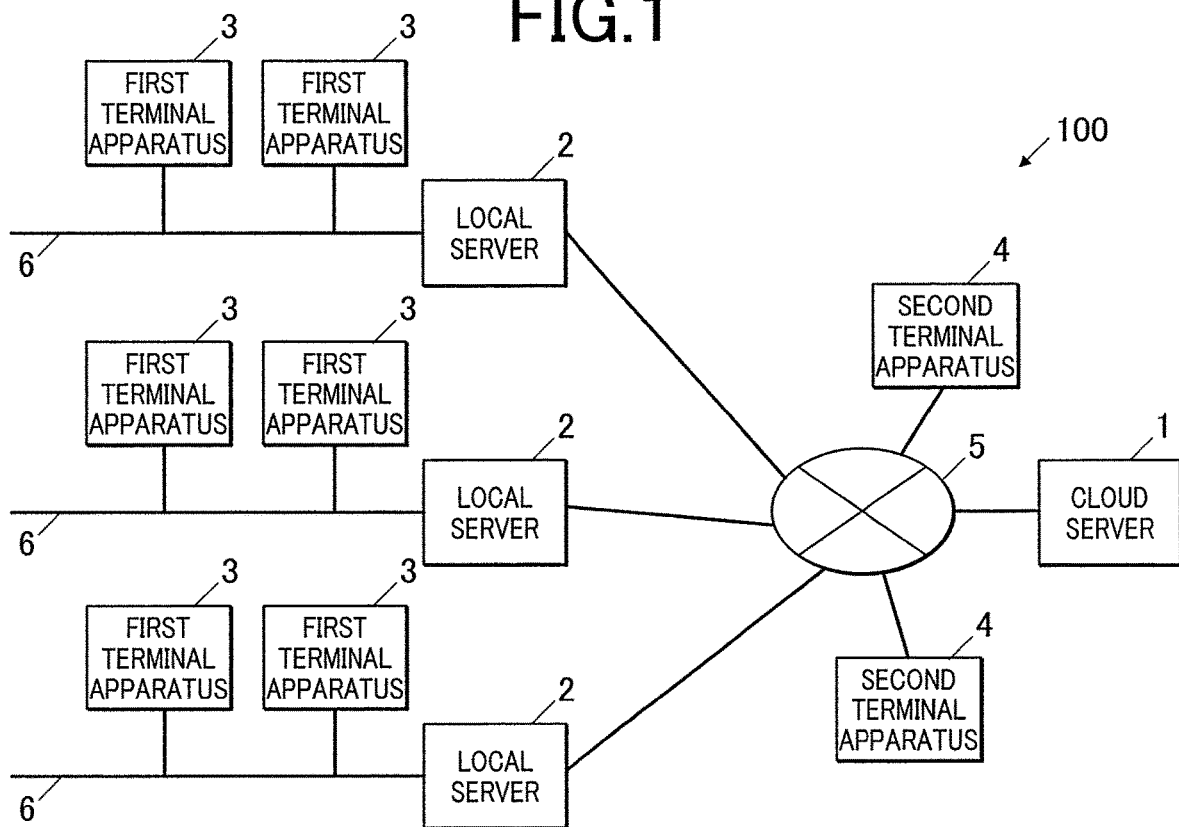
FIG. 1 is a block diagram showing an information processing system according to an embodiment of the present invention.

FIG. 1 is a diagram showing a schematic configuration of an information processing system 100.

As shown in FIG. 1, the information processing system 100 according to the present embodiment includes a cloud server 1 (information processing apparatus), a plurality of local servers 2 (terminal), a plurality of first terminal apparatuses 3, and a plurality of second terminal apparatuses 4. For example, the cloud server 1 is connected to the local servers 2 to be able to communicate information through the internet 5. For example, the local servers 2 are connected to the first terminal apparatus 3 to be able to communicate information through a LAN (Local Area Network) 6. The second terminal apparatus 4 is connected to the cloud server 1 through the internet 5 to be able to communicate information through the internet 5.

The cloud server 1 is a server which provides to the user a cloud service as part of the information processing system 100. The cloud server 1 stores and manages for each user (client) an operation information database (DB) regarding operation information. The cloud server 1 executes various programs to perform processes to realize functions regarding introduction of a sales management system (predetermined system) to a local server 2 owned by a new user, and various data processes in the operation information DB for existing users (for example, processes to perform functions such as reference to information regarding customers and merchandise, viewing of slips and invoices, marketing analysis and the like).

For example, the local server 2 is a server positioned in an office of a user (client) such as an owner of a private company, an owner of a small/medium company or a store manager of a private store. The local server 2 sets up the sales management system provided from the cloud server 1 to perform various data processes (for example, processes to perform functions such as sales management, purchasing management, inventory management) regarding the sales management DB (predetermined database) included in the sales management system. The sales management DB is included in the operation information DB, and the local server 2 stores and manages the operation information DB.

For example, the first terminal apparatus 3 is a tablet PC (personal computer), a note PC, a desktop PC or the like. The first terminal apparatus 3 shares the operation information DB stored in the local server 2 through the LAN 6. Similar to the local server 2, the first terminal apparatus 3 executes various programs installed in advance to perform various data processes in the operation information DB.

For example, the second terminal apparatus 4 is an apparatus which the user is able to use outside the office such as a smartphone, a tablet PC, a cellular phone, a PDA, a note PC, or a desktop PC. The second terminal apparatus 4 receives input from the user, transmits the information based on the input to the cloud server 1, and displays the information received from the cloud server 1. The second terminal apparatus 4 may also function as the above-described first terminal apparatus 3.

Figure 2:
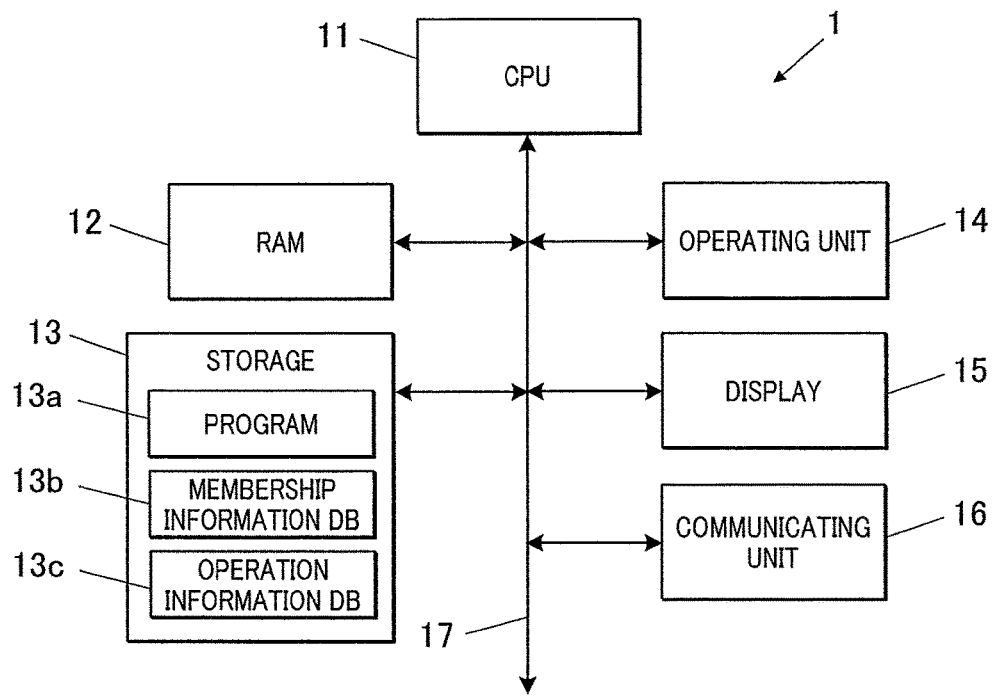
FIG. 2 is a block diagram showing a functional configuration of a cloud server.

FIG. 2 is a block diagram showing a functional configuration of a cloud server 1.

As shown in FIG. 2, the cloud server 1 includes a CPU (Central Processing Unit) 11 (receiver, first generating unit (generator), setting unit, first transmitting controller (transmitting controller), first obtaining unit, second generating unit, second obtaining unit, recorder, authenticating unit), a RAM (Random Access Memory) 12, a storage 13, an operating unit 14, a display 15, and a communicating unit 16. Each unit of the cloud server 1 is connected to each other through a bus 17.

The CPU 11 controls each unit of the cloud server 1. The CPU 11 reads a specified program among the system program and application programs stored in the storage 13, deploys the programs in the work area of the RAM 12, and executes various processes according to the programs.

The RAM 12 is a volatile memory, for example, and includes a work area to temporarily store various programs and data read by the CPU 11.

The storage 13 includes a HDD (Hard Disk Drive), a SSD (Solid State Drive), for example, and is a storage in which data and programs are readable and writable. The storage 13 stores a program 13a, a membership information DB 13b (user information database), an operation information DB 13c and the like.

The program 13a includes the above-described various system programs and application programs executed by the CPU 11.

User information of the user who performed membership registration when using the sales management system and authentication information are registered in the membership information DB 13b.

The operation information DB 13c is the database in which the operation information for the target of management (user owning the local servers 2) in the information processing system 100 is registered. The operation information DB 13c can be synchronized with operation information DB 23b of the local servers 2.

For example, the operating unit 14 includes a key input unit such as a keyboard or a pointing device such as a mouse. The operating unit 14 receives the key input and the position input, and outputs the operating information to the CPU 11.

For example, the display 15 includes a LCD (Liquid Crystal Display), an organic EL (Electro Luminescence) display and the like. According to the instruction of the display signal received from the CPU 11, the display 15 displays various screens.

For example, the communicating unit 16 includes a network card, etc. The communicating unit 16 is connected to communicate with the internet 5, and communicates with the device (for example, local server 2, second terminal apparatus 4, etc.) on the internet 5.

FIG. 3 is a block diagram showing a functional configuration of the local server 2.

As shown in FIG. 3, the local server 2 includes a CPU 21, a RAM 22, a storage 23, an operating unit 24, a display 25, and a communicating unit 26. Each unit of the local server 2 is connected to each other through a bus 27.

The CPU 21 controls each unit of the local server 2. The CPU 21 reads a program specified among the system program and the application programs stored in the storage 23, deploys the specified program in the work area of the RAM 22, and executes various processes according to the program.

For example, the RAM 22 is a volatile memory, and includes a work area to temporarily store various programs and data read by the CPU 21.

For example, the storage 23 includes a HDD, a SSD, etc., and is a storage in which data and programs can be written and read out. The storage 23 stores a program 23a, and operation information DB 23b.

The program 23a includes the above-described various system programs and application programs executed by the CPU 21.

The operation information DB 23b is a database in which operation information for the target of management (user possessing local server 2 in which operation information DB 23b is stored) in the information management system 100 is registered.

The configuration of the operating unit 24, the display 25, and the communicating unit 26 is the same as the configuration of the operating unit 14, the display 15, and the communicating unit 16 of the cloud server 1, and therefore, the detailed description is omitted.

FIG. 4 is a block diagram showing a functional configuration of the first terminal apparatus 3.

As shown in FIG. 4, the first terminal apparatus 3 includes a CPU 31, a RAM 32, a storage 33, an operating unit 34, a display 35, and a communicating unit 36. Each unit of the first terminal apparatus 3 is connected to each other through a bus 37.

The CPU 31 controls each unit of the first terminal apparatus 3. The CPU 31 reads a program specified among the system program and the application programs stored in the storage 33, deploys the specified program in the work area of the RAM 32, and executes various processes according to the program. Here, the CPU 31 controls the RAM 32 to store various processing results, and controls the display 35 to display the processing results as necessary.

For example, the RAM 32 is a volatile memory including a work area temporarily storing various programs and data readout by the CPU 31.

For example, the storage 33 includes a HDD, a SSD, etc., and is a storage in which data and programs can be written and read out. The storage 33 stores a program 33a. The program 33a includes the above-described various system program and application programs executed by the CPU 31.

The configuration of the operating unit 34, the display 35, and the communicating unit 36 is the same as the configuration of the operating unit 14, the display 15, and the communicating unit 16 of the cloud server 1, and therefore, the detailed description is omitted.

Figure 5:
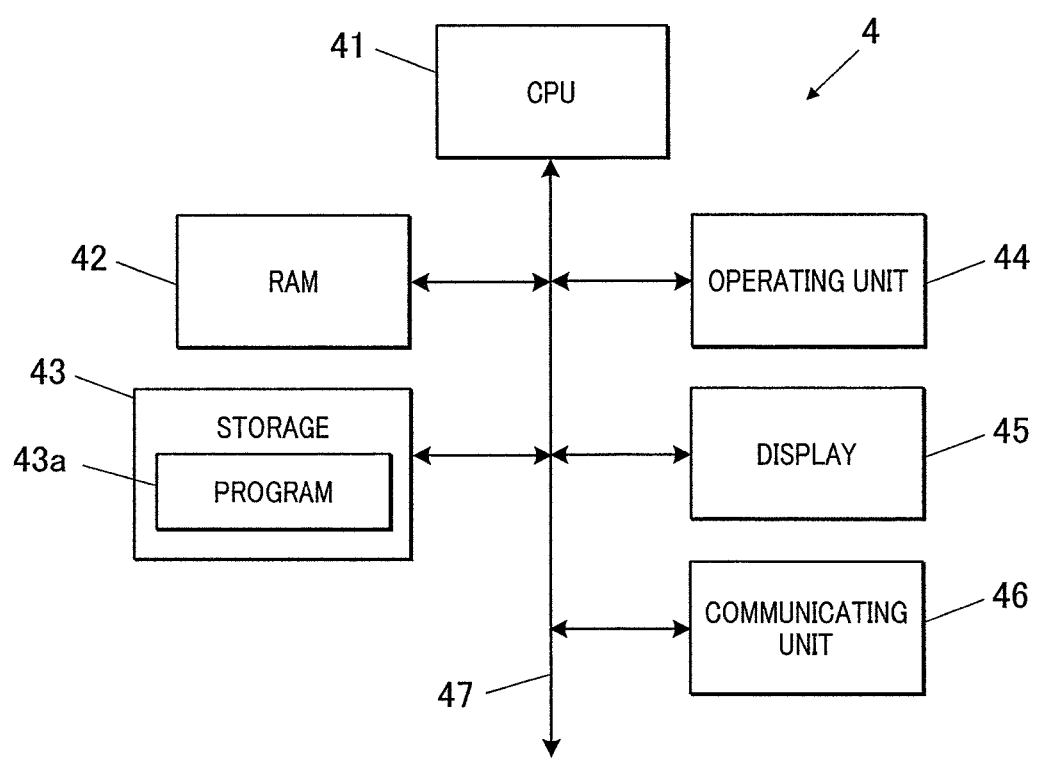
FIG. 5 is a block diagram showing a functional configuration of a second terminal apparatus.

FIG. 5 is a block diagram showing a functional configuration of a second terminal apparatus 4.

As shown in FIG. 5, the second terminal apparatus 4 includes a CPU 41, a RAM 42, a storage 43, an operating unit 44, a display 45, and a communicating unit 46. Each unit of the second terminal apparatus 4 is connected to each other through the bus 47. The configuration of the second terminal apparatus 4 is the same as the configuration of the first terminal apparatus 3 and the detailed description is omitted.

<Introduction Method of Sales Management System>

According to the information management system 100 of the present embodiment, the sales management system (predetermined software) provided by the cloud server 1 can be introduced in the local server 2. Hereinafter, the introduction method of the sales management system is described.

Figure 6:
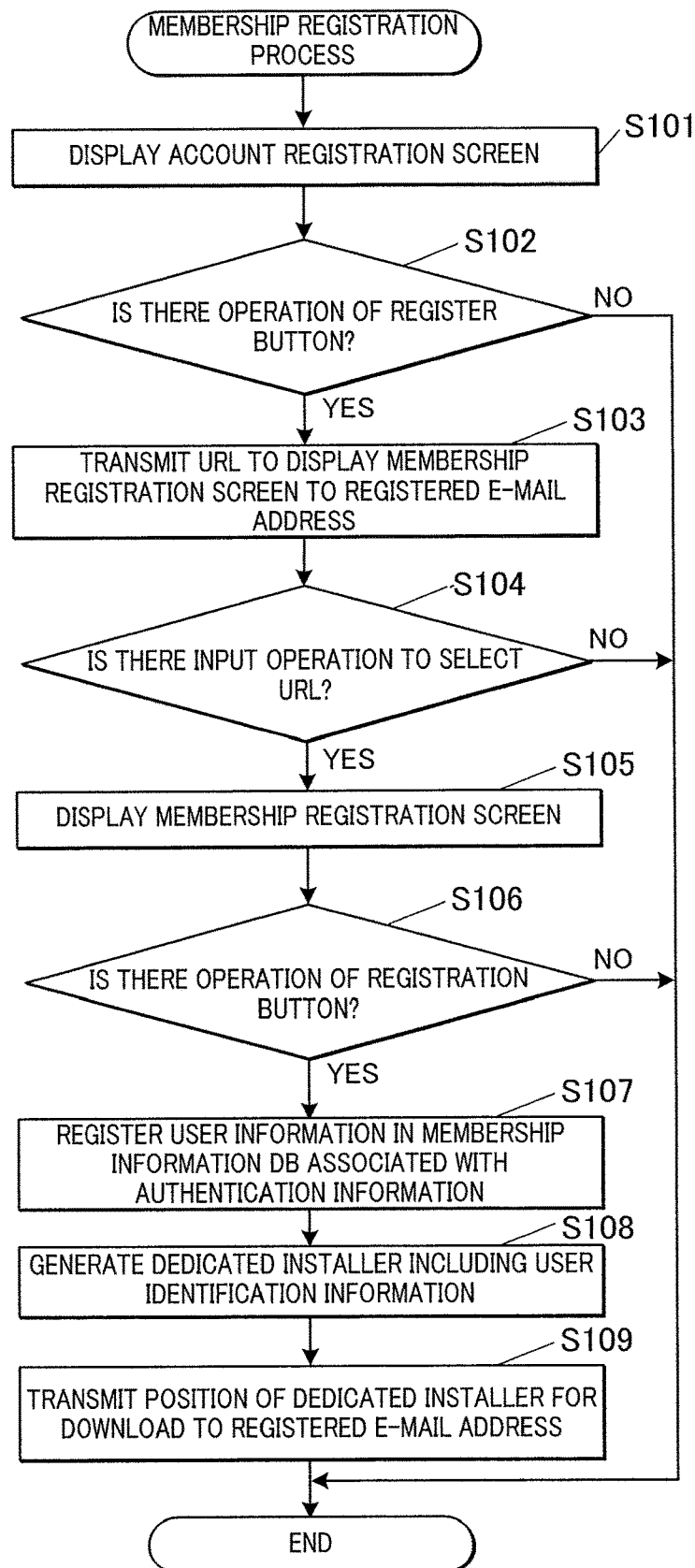
FIG. 6 is a flowchart showing a membership registration process.

First, the method of membership registration which is to be the precondition before introducing the sales management system is described using FIG. 6 to FIG. 8. FIG. 6 is a flowchart showing a membership registration process performed in the cloud server 1. FIG. 7 is a diagram showing an account registration screen. FIG. 8 is a diagram showing a membership registration screen.

As shown in FIG. 6, when a membership registration request regarding the sales management system is made by the local server 2 which accessed to the WEB site of the cloud server 1, the CPU 11 of the cloud server 1 first displays the account registration screen 51 shown in FIG. 7 on the display 25 of the local server 2 (step S101).

The account registration screen 51 shown in FIG. 7 displays a text box A1 to input an e-mail address of the user who performs the membership registration, a text box A2 to input the e-mail address for confirmation, a text box A3 to input a password, a register button B1 to perform registration with the contents input on the account registration screen 51, and a cancel button B2 to cancel the above contents.

Next, the CPU 11 of the cloud server 1 determines whether the register button B1 is input to be selected in a state with the necessary items input on the account registration screen 51 (step S102).

In step S102, when it is determined that the register button B1 is not input, that is, the cancel button B2 is input to be selected (step S102; NO), the CPU 11 of the cloud server 1 ends the membership registration process.

In step S102, when it is determined that the register button B1 is input (step S102; YES), the CPU 11 of the cloud server 1 transmits e-mail with a URL attached to the registered e-mail address in step S103. The URL is for displaying a later-described membership registration screen (step S103).

Next, the CPU 11 of the cloud server 1 determines whether the URL attached to the mail transmitted in step S103 is input to be selected (step S104).

In step S104, when it is determined that the URL is not input (step S104; NO), the CPU 11 of the cloud server 1 ends the membership registration process.

In step S104, when it is determined that the URL is input (step S104; YES), the CPU 11 of the cloud server 1 displays the membership registration screen 52 on the display 25 of the local server 2 as shown in FIG. 8 (step S105).

The membership registration screen 52 as shown in FIG. 8 displays text boxes A4 to A16 to input items such as password, contractant name, contractant name in kana character, company name, postal code, address, phone number, FAX number, industry type classification, number of employees, sales, desire for demo data, range of system use, and the like. The register button B3 which performs registration according to the contents input on the membership registration screen 52 and the cancel button B4 to cancel the contents are also displayed. Here, the text box A12 to input the classification of industry type is a pulldown type to be able to select the industry type classification. Specifically, the industry type to which the user belongs can be selected from 17 industry types set in the industry type table T1 shown in FIG. 10. The text box A15 to input the desire for demo data is a pulldown type to select the desire for demo data, and the selection is made between whether the demo data is desired or not. The text box A16 to input the range of system use is a pulldown type to select the range of system use, and the selection is made between normal use and easy use.

Next, the CPU 11 of the cloud server 1 determines whether the input to select the register button B3 is made in the state with the necessary items input on the membership registration screen 52 (step S106).

In step S106, when it is determined that the register button B3 is not input, that is, the cancel button B4 is input to be selected (step S106; NO), the CPU 11 of the cloud server 1 ends the membership registration process.

In step S106, when it is determined that the register button B3 is input to be selected (step S106; YES), the CPU 11 of the cloud server 1 registers in the membership information DB 13b the information (user information) input on the membership registration screen 52 associated with authentication information (e-mail address and password) input on an account registration screen 51 (step S107).

Next, the CPU 11 of the cloud server 1 generates a dedicated installer (installer) including user identification information (for example, user ID, etc.) to discriminate the user who registered in step S107 (step S108). This dedicated installer is software which supports the process of installing setup data to setup a later-described sales management system.

Next, the CPU 11 of the cloud server 1 provides the dedicated installer generated in step S108 for downloading, and sends e-mail showing where the dedicated installer is positioned added to the e-mail to the e-mail address of the user registered in step S107 (step S109). With this, the membership registration process ends.

Figure 9:
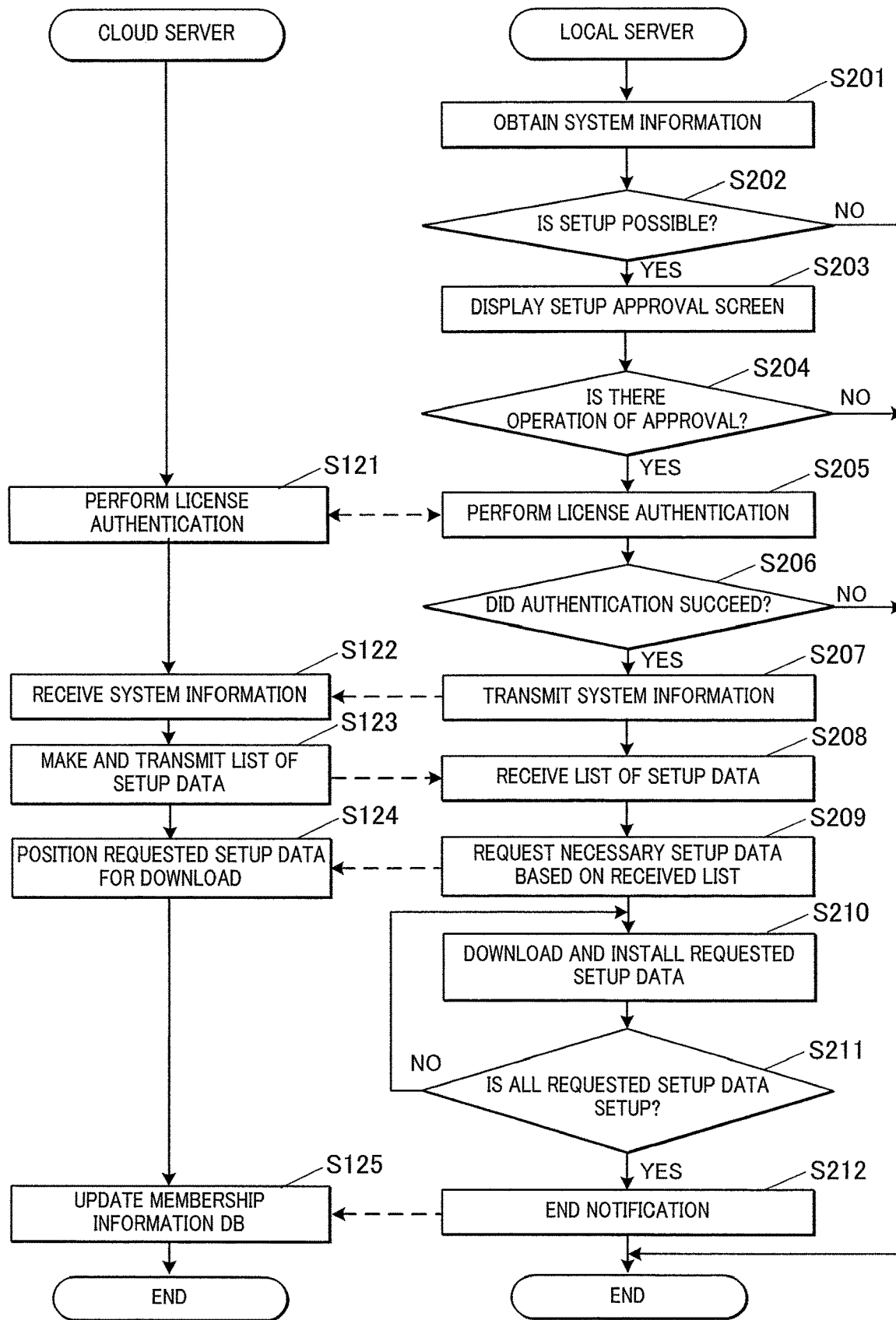
FIG. 9 is a flowchart showing a flow of a setup process performed in the information processing system.

The setup method of the sales management system is described using FIG. 9. FIG. 9 is a flowchart showing a flow of the setup process of the sales management system. The process of the local server 2 is a process performed when the dedicated installer provided for download in the above-described membership registration process (see FIG. 6) is downloaded and started in the local server 2.

As shown in FIG. 9, the CPU 21 of the local server 2 obtains system information of the local server 2 (for example, property information showing type of OS (Operating System), state of installing of software).

Next, the CPU 21 of the local server 2 performs confirmation of the setup conditions of the OS and whether it is already setup based on the system information obtained in step S201, and determines whether the environment allows setup of the sales management system (step S202).

In step S202, when it is determined that the environment does not allow setup of the sales management system (step S202; NO), the CPU 21 of the local server 2 ends the setup process.

In step S202, when it is determined that the environment allows setup of the sales management system (step S202; YES), the CPU 21 of the local server 2 displays the setup approval screen (not shown) on the display 25 (step S203).

Next, the CPU 21 of the local server 2 determines whether the input to select the approve button (not shown) is made on the setup approval screen (step S204).

In step S204, when it is determined that the input operation to select the approve button is not performed (step S204; NO), the CPU 21 of the local server 2 ends the setup process.

In step S204, when it is determined that the input to select the approve button is performed (step S204; YES), the CPU 21 of the local server 2 connects the communication with the cloud server 1 through the internet 5 and performs license authentication with the cloud server 1 (step S205, S121). Here, the license authentication is performed using the user identification information (for example, user ID, etc.) included in the dedicated installer. In order to strengthen security, some of the information used in authentication (for example, password) can be input by user operation.

Next, when the license authentication does not succeed (step S206; NO), the CPU 21 of the local server 2 ends the setup process.

When the license authentication succeeds (step S206; YES), the CPU 21 of the local server 2 transmits the system information obtained in step S201 to the cloud server 1 (step S207).

Based on the system information received from the local server 2 in step S122, the CPU 11 of the cloud server 1 performs processes such as select the setup data suitable for the OS provided in the local server 2 and remove the setup data of the software already installed, and forms a list (data) of the setup data in order to setup the sales management system and sends the list to the local server 2 (step S123). Here, other than the application to apply the sales management system, the data input form to use the system (for example, slip input form, etc.) and the sales management DB is included in the sales management system. The CPU 11 of the cloud server 1 obtains the user information (membership information) from the membership information DB 13b. The CPU 11 lists up, for example, setup data to setup the sales management DB reflecting the user information, setup data to setup (update) the sales management DB based on sample data (later-described) corresponding to the industry type information which is one type of information in the user information, setup data to setup (update) the data input form based on the setup state of the data input form corresponding to the industry type information, and the setup data to setup the sales management system reflecting the system use range information which is one type of the membership information. The CPU 11 sends the list to the local server 2.

When the input to select the necessary setup data is made by user operation, the CPU 21 of the local server 2 which received the list from the cloud server 1 in step S208 transmits a request signal to request to the cloud server 1 necessary setup data selected based on the list (step S209).

The CPU 11 of the cloud server 1 which received the request signal generates the requested setup data and positions the data for download (step S124). Specifically, for example, when setup data (database setup data) is requested to setup the sales management DB (predetermined database) reflecting the user information, the cloud server 1 generates setup data including the user information (e-mail address, contractant name, company name, postal code, address, phone number, FAX number), and positions the data for download. Then, the local server 2 downloads the setup data and installs the data so that the sales management DB reflecting the user information can be setup. With this, it is possible to eliminate the burden of the user to register the user information after setup of the sales management DB.

Figure 10:
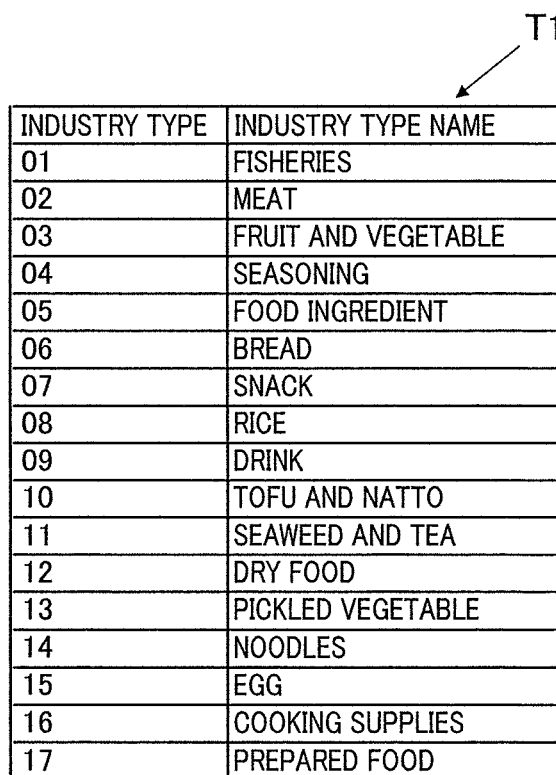
FIG. 10 is a diagram showing an industry type table.

For example, when the setup data to setup (update) the sales management DB based on the sample data corresponding to the industry type information which is one type of user information is requested, the cloud server 1 refers to the industry type table T1 shown in FIG. 10, extracts from the merchandise sample table T2 shown in FIG. 11 merchandise sample data corresponding to the industry type (for example, "01 fisheries"), extracts from the unit sample table T3 shown in FIG. 12 unit sample data, generates the setup data including the sample data, and positions the data for download. Then, the local server 2 downloads the setup data and installs the data so that the sales management DB for the industry type to which the user belongs can be setup. With this, there is no burden on the user to set the sample data for the industry type after setup of the sales management DB.

For example, when setup data to setup (update) the data input form based on the setup state of the data input form corresponding to the industry type information which is one piece of the user information (form setup data) is requested, the cloud server 1 refers to the form setup state table T4 shown in FIG. 13, extracts the form data with the form number corresponding to the industry type (for example, "01 fisheries"), generates the setup data including the form data and positions the data for download. The local server 2 downloads and installs the setup data. With this, the user is able to setup the data input form suitable for the industry type.

Figure 14A:
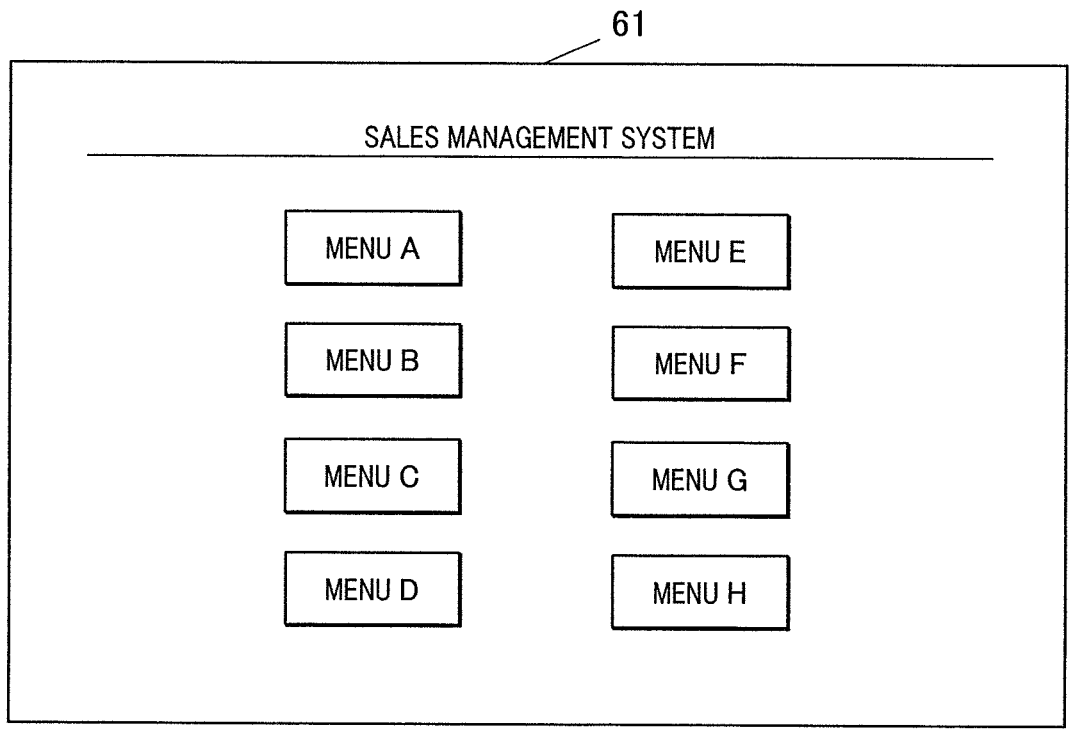
FIGS. 14A and 14B are diagrams showing a main screen of a sales management system.
Figure 14B:
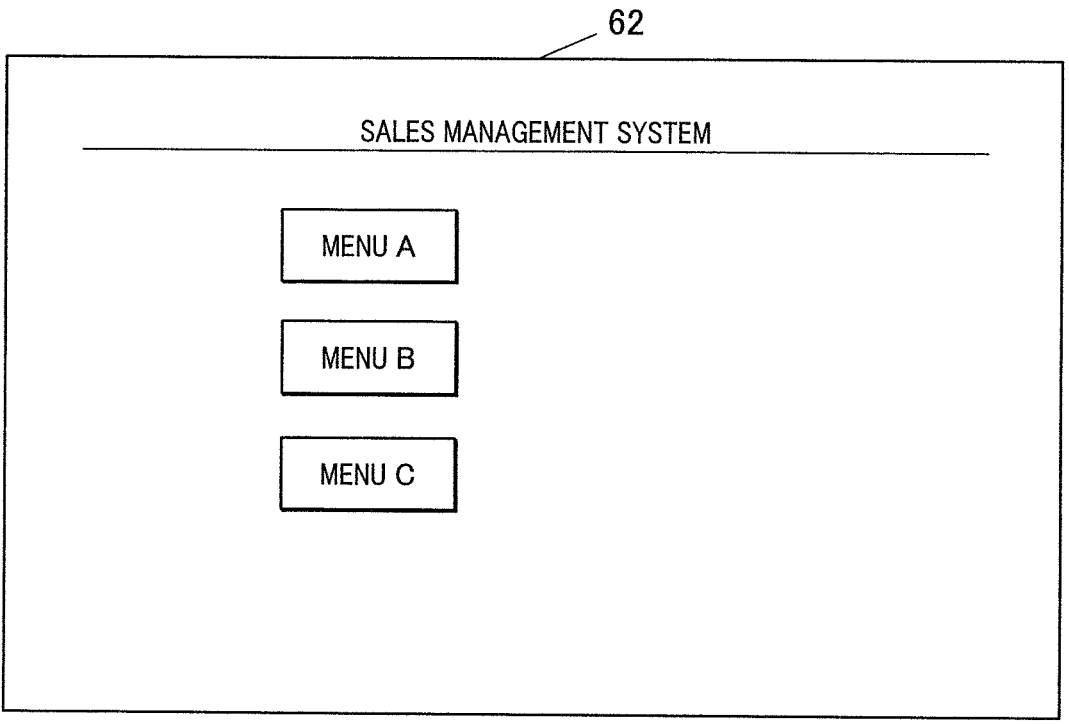

For example, when the setup data to setup the sales management system reflecting the system use range information which is one type of user information is requested, the cloud server 1 generates the setup data including the system use range information (for example, simple use, normal use), and positions the data for download. The local server 2 downloads and installs the setup data. With this, the local server 2 sets up the use range control DB reflecting the system use range information and controls the use range of the sales management system. Specifically, for example, if the system use range information is registered as normal use when membership registration is performed, as shown in FIG. 14, the main screen 61 of the sales management system is set, so that all of the operation menus (menus A to H) can be used when the user sets up and starts the sales management system reflecting the system use range information. If the system use range information is registered as simple use when the membership registration is performed, as shown in FIG. 14B, the main screen 62 of the sales management system is set so that only menus A to C can be used when the user sets up and starts the sales management system reflecting the system use range information.

Returning to the description of the setup process, in step S210, the CPU 21 of the local server 2 downloads the setup data positioned for download and installs the setup data (step S210). Then, the CPU 21 of the local server 2 determines whether all of the requested setup data is installed and the setup is performed (step S211).

In step S211, when it is determined that all of the requested setup data is not installed and the setup is not performed (step S211; NO), the CPU 21 of the local server 2 returns the process to step S210. In step S211, when it is determined that all of the requested setup data is installed and the setup is performed (step S211; YES), the CPU 1 of the local server 2 sends an end notification to the cloud server 1 (step S212), the CPU 11 of the cloud server 1 which receives the end notification registers (updates) the information of the local server 2 which performed the end notification (for example, system information, etc.) to the membership information DB 13b and ends the setup process.

According to the cloud server 1 of the present embodiment, the registration of the user information is received, the dedicated installer including the user identification information to identify the user with the user information is generated, and the dedicated installer is set so that the dedicated installer can be downloaded. When the dedicated installer is downloaded and started, and the cloud server 1 is connected to the local server 2 (terminal) starting the dedicated installer through the internet 5, the data to setup the sales management system (predetermined software) corresponding to the user information is transmitted to the local server 2.

Therefore, the user does not have to set and register user information on the sales management system after the system is setup. With this, the operation regarding the setup of the sales management system can be made simple.

According to the cloud server 1 of the present embodiment, data to setup the sales management system (predetermined software) includes database setup data to setup the sales management DB which can be used in the sales management system. The database setup data to setup the sales management DB in a state reflecting the user information is transmitted to the local server 2. Therefore, the user does not have to set and register the user information on the sales management DB after setup, and the operation regarding setup of the sales management DB becomes simple.

According to the cloud server 1 of the present embodiment, the user information includes the industry type information showing the industry type to which the user belongs, and the setup state of the database corresponding to the industry type information is set. The database setup data based on the setup state of the database corresponding to the industry type information is transmitted to the local server 2. Therefore, the user does not have to set the sales management DB to be suitable for the industry type to which the user belongs after the sales management DB is setup, and the burden on the user is reduced.

According to the cloud server 1 of the present embodiment, the data to setup the sales management system (predetermined software) includes the form setup data to setup the predetermined data input form which can be used in the sales management system. The user information includes the industry type information showing the industry type to which the user belongs. The setup state of the corresponding data input form is set for each industry type information, and the form setup data based on the setup state of the data input form corresponding to the industry type information is transmitted to the local server 2. Therefore, for example, the user does not have to set the data input form which is used highly frequently in the industry to which the user belongs after setup of the data input form, and the burden on the user is reduced.

According to the cloud server 1 of the present embodiment, the user information includes the user range information showing the range of use of the sales management system. The data to setup the sales management system reflecting the use range information is transmitted to the local server 2. Therefore, the range of use of the sales management system does not have to be set after the setup of the sales management system and the burden on the user is reduced.

According to the cloud server 1 of the present embodiment, the system information (property information) of the local server 2 is obtained and the suitable data according to the system information is transmitted to the local server 2. Therefore, a user who does not have expertise in computers can also easily setup the sales management system.

According to the cloud server 1 of the present embodiment, the setup data list which suits the system information and which can be downloaded by the local server 2 is generated, the generated list is transmitted to the local server 2, and only the data requested from the list is transmitted to the local server 2. Therefore, a user who does not have expertise in computers can also easily setup the sales management system.

According to the cloud server 1 of the present embodiment, the setup end information showing that the setup by the local server 2 ended is obtained and the information of the local server 2 in which setup ended and the user information regarding the user who performed the setup are associated and recorded in the membership information DB 13b. Therefore, the information of the local server 2 which performed setup of the sales management system can be managed in the cloud server 1.

According to the cloud server 1 of the present embodiment, the dedicated installer is downloaded and started. When the cloud server 1 is connected through the internet 5 to the local server 2 with the dedicated installer started, license authentication is performed based on the user identification information included in the dedicated installer. When the license authentication succeeds, the data to setup the sales management system is transmitted to the local server 2. Therefore, it is possible to prevent unauthorized setup of the sales management system.

According to the dedicated installer of the present embodiment, the user identification information to identify the user according to the user information is received by the cloud server 1. When the dedicated installer is downloaded and started, and the cloud server 1 is connected through the internet 5 to the local server 2 with the dedicated installer started, the dedicated installer requests to the cloud server 1 the transmitting of the data to setup the sales management system corresponding to the user information. Therefore, the local server 2 is able to setup the sales management system corresponding to the user information by simply receiving the data and setting up the data. With this, the user does not have to set and register the user information on the sales management system after setup and the operation regarding setup of the sales management system becomes simple.

According to the above description, the example using the HDD, SSD, etc. of the storage 13 as the computer readable medium for the program 13a of the cloud server 1 according to the present invention is described. However, the present invention is not limited to the above. A portable recording medium such as a CD-ROM can be used as other computer readable mediums. The data of the program 13a of the cloud server 1 can be provided through the communication lines using a medium such as a carrier wave.

The description of the above embodiments is merely one, example of the information processing apparatus and the program regarding the present invention, and the present invention is not limited to the above.

The detailed configuration and detailed operation of the components of the information processing system 100 according to the present invention can be suitably modified without leaving the scope of the present invention.

For example, according to the cloud server 1 of the present embodiment, the setup data to setup the sales management system reflecting the information regarding the number of employees which is one of the membership information can be provided. By providing such setup data, for example, after setup of the sales management system, there is no need for the user to set the sales management system according to the size of the company which the user operates.

According to the cloud server 1 of the present embodiment, the setup data to setup (update) the sales management DB reflecting the information regarding the desire of the demo data (for example, aggregated data for business analysis tools) which is one of the membership information can be provided. By providing such setup data, for example, the sales management DB is setup reflecting the information of the desired aggregated data for the business analysis tool and the business analysis tool can be executed immediately.

Although embodiments of the present invention are described above, the scope of the present invention is not limited to the embodiments described above. The scope of the present invention includes the present invention as claimed and its equivalents.

What is claimed is:

1. An information processing apparatus which transmits data to setup predetermined software in a terminal, the apparatus comprising:
    a processor which is configured to perform:
    a first storage control process in which predetermined identification information corresponded to customizing information to customize the data is stored in a storage when registration of the predetermined identification information and the customizing information to customize the data is received through a communicating unit,
    a first generating process in which an installer to install the data is generated in a state including the predetermined identification information corresponded to the customizing information and in which the installer is stored in the storage in a downloadable state,
    a customization process in which the data to setup the predetermined software is customized according to the customizing information corresponded to the predetermined identification information such that functional content of the predetermined software is changed according to the customizing information, when the installer is downloaded and started on the terminal and the terminal in which the installer is started is connected to the information processing apparatus through a network, and
    a first transmitting control process in which the data customized by the customizing information in the customization process is transmitted to the terminal through the communicating unit,
    wherein:
    the data includes database setup data to setup a predetermined database which can be used in the predetermined software,
    the customizing information includes industry type information which shows an industry type to which the user belongs,
    a setup state of the database corresponding to each industry type is set, and
    the processor performs the first transmitting control process in which the database setup data based on the setup state of the database corresponding to the industry type stored by the first storage control process is transmitted to the terminal through the communicating unit.

2. The information processing apparatus according to claim 1, wherein the processor is configured to perform a first display control process in which an information registration screen to register the predetermined identification information and the customizing information is displayed on a display of the terminal when an information registration request to register predetermined information is requested from the terminal.

3. The information processing apparatus according to claim 2, wherein:
    the processor is configured to perform a second display control process in which the transmitted data is displayed on the display of the terminal when the predetermined software is setup, and
    when use range information showing a use range of the predetermined software is included in the registered customizing information, the processor performs the first transmitting control process in which data corresponding to the use range information is transmitted to the terminal through the communicating unit and the processor performs the second display control process in which data corresponding to the use range information is displayed on the display of the terminal.

4. The information processing apparatus according to claim 1, wherein the predetermined identification information is user identification information which identifies the user.

5. The information processing apparatus according to claim 1, wherein:
    the data includes form setup data to setup a predetermined data input form which can be used in the predetermined software,
    a setup state of the data input form corresponding to each industry type information is set, and
    the processor performs the first transmitting control process in which the form setup data based on the setup state of the data input form corresponding to the industry type information stored by the first storage control process is transmitted to the terminal through the communicating unit.

6. The information processing apparatus according to claim 1, wherein:
    the processor is configured to perform a first obtaining process in which property information of the terminal is obtained through the communicating unit, and the processor performs the first transmitting control process in which the data suitable for the property information obtained by the first obtaining process is transmitted to the terminal through the communicating unit.

7. The information processing apparatus according to claim 6, wherein:
the processor is configured to perform a second generating process in which a list of the data which is suitable for the property information obtained by the first obtaining process and which is downloadable by the terminal is generated and stored in the storage,
the processor is configured to perform a second transmitting control process in which a list generated by the second generating process is transmitted to the terminal through the communicating unit, and
the processor performs the first transmitting control process in which only the data which is requested from the list is transmitted to the terminal through the communicating unit.

8. The information processing apparatus according to claim 4, wherein:
the processor is configured to perform a second obtaining process in which setup end information showing that the setup by the terminal ended is obtained through the communicating unit, and
the processor is configured to perform a second storage control process in which the processor stores information of the terminal in which setup ended corresponded to the user identification information of the user who performed the setup in a user information database in the storage when the setup end information is obtained by the second obtaining process.

9. The information processing apparatus according to claim 4, wherein:
the processor is configured to perform an authentication process in which license authentication is performed by obtaining the user identification information included in the installer through the communicating unit when the installer is downloaded and started and the terminal in which the installer is started is connected to the information processing apparatus through the network, and
the processor performs the first transmitting control process in which the data is transmitted to the terminal through the communicating unit when the authentication in the authentication process succeeds.

10. A method executed by an information processing apparatus which includes a processor and which transmits data to set up predetermined software in a terminal, the method comprising:
storing in which predetermined identification information corresponded to customizing information to customize the data is stored in a storage when registration of the predetermined identification information and the customizing information to customize the data is received through a communicating unit,
generating in which an installer to install the data is generated in a state including the predetermined identification information corresponded to the customizing information and in which the installer is stored in the storage in a downloadable state,
customizing in which the data to setup the predetermined software is customized according to the customizing information corresponded to the predetermined identification information such that functional content of the predetermined software is changed according to the customizing information, when the installer is downloaded and started on the terminal and the terminal in which the installer is started is connected to the information processing apparatus through a network, and
transmitting in which the data customized by the customizing information in said customizing is transmitted to the terminal through the communicating unit;
wherein:
the data includes database setup data to setup a predetermined database which can be used in the predetermined software,
the customizing information includes industry type information which shows an industry type to which the user belongs,
a setup state of the database corresponding to each industry type is set, and
in the transmitting, the database setup data based on the setup state of the database corresponding to the industry type stored in said storing is transmitted to the terminal through the communicating unit.

11. A non-transitory computer-readable storage medium having a program stored thereon for controlling a computer used in an information processing apparatus which transmits data to setup predetermined software in a terminal, wherein the program is executable by the computer to control the computer to perform a processing operation comprising:
a storage control process in which predetermined identification information corresponded to customizing information to customize the data is stored in a storage when registration of the predetermined identification information and the customizing information to customize the data is received through a communicating unit,
a first generating process in which an installer to install the data is generated in a state including the predetermined identification information corresponded to the customizing information and in which the installer is stored in the storage in a downloadable state,
a customization process in which the data to setup the predetermined software is customized according to the customizing information corresponded to the predetermined identification information such that functional content of the predetermined software is changed according to the customizing information, when the installer is downloaded and started on the terminal and the terminal in which the installer is started is connected to the information processing apparatus through a network, and
a first transmitting control process in which the data customized by the customizing information in the customization process is transmitted to the terminal through the communicating unit,
wherein:
the data includes database setup data to setup a predetermined database which can be used in the predetermined software,
the customizing information includes industry type information which shows an industry type to which the user belongs,
a setup state of the database corresponding to each industry type is set, and
the first transmitting control process is performed in which the database setup data based on the setup state of the database corresponding to the industry type stored by the storage control process is transmitted to the terminal through the communicating unit.

* * * * *